United States Patent [19]

Asayama et al.

[11] Patent Number: 5,168,973
[45] Date of Patent: Dec. 8, 1992

[54] APPARATUS FOR CONTROLLING HYDRAULIC PRESSURE FOR CLUTCH

[75] Inventors: Yoshio Asayama; Makio Tsubota; Yasunori Okura; Takayuki Sato, all of Kanagawa, Japan

[73] Assignee: Kabushiki Kaisha Komatsu Seisakusho, Tokyo, Japan

[21] Appl. No.: 693,306

[22] Filed: Apr. 29, 1991

Related U.S. Application Data

[62] Division of Ser. No. 299,923, Nov. 22, 1988, Pat. No. 5,035,312.

[30] Foreign Application Priority Data

| Mar. 25, 1987 | [JP] | Japan | 62-70990 |
| Mar. 25, 1987 | [JP] | Japan | 62-70991 |
| Mar. 25, 1987 | [JP] | Japan | 62-70992 |
| Mar. 25, 1987 | [JP] | Japan | 62-70993 |
| Nov. 30, 1987 | [JP] | Japan | PCT/JP87/00929 |

[51] Int. Cl.$^5$ .............................................. F16D 25/11
[52] U.S. Cl. .............................. 192/85 R; 192/87.11; 192/109 F
[58] Field of Search ............. 192/85 R, 109 F, 30 W, 192/87.1, 87.11; 137/486, 625.65; 91/433, 459

[56] References Cited

U.S. PATENT DOCUMENTS

| 3,566,716 | 3/1971 | Chatterjea | 192/109 F X |
| 3,618,424 | 11/1971 | Golan et al. | 192/109 F X |
| 3,722,646 | 3/1973 | Oguma | 192/109 F |
| 3,809,201 | 5/1974 | Miyanishi et al. | 192/109 F |
| 3,874,255 | 4/1975 | Minami | 74/866 |
| 3,991,865 | 11/1976 | Komatsu | 192/109 F |
| 4,000,795 | 1/1977 | Patton | 192/109 F |
| 4,086,994 | 5/1978 | Hirosawa et al. | 192/109 F |
| 4,465,168 | 8/1984 | Sato | 192/109 F X |
| 4,531,433 | 7/1985 | Suga | 74/869 |

FOREIGN PATENT DOCUMENTS

| 3010865 | 1/1981 | Fed. Rep. of Germany . |
| 54-8424 | 4/1979 | Japan . |
| 54-27622 | 9/1979 | Japan . |
| 55-48209 | 11/1980 | Japan . |
| 60-84850 | 6/1985 | Japan . |
| 1450816 | 9/1976 | United Kingdom . |

Primary Examiner—Richard Lorence
Attorney, Agent, or Firm—Diller, Ramik & Wight

[57] ABSTRACT

The present invention provides an apparatus for controlling a hydraulic pressure usable for a clutch wherein the appratus is employed for a transmission mounted on a construction machine or the like in such a manner that it is provided separately for a plurality of clutches 1 and it is controlled individually. The apparatus includes a first valve 3 for allowing a large amount of hydraulic oil to flow in the clutch and a second valve 4 for electronically controlling a clutch pressure so that the termination of filling and the clutch pressure are detected by a simple structural arrangement on the basis of a displacement of a spool 21 for the first valve 3 and a separately disposed piston. In addition, appearing of an overshoot pressure on the termination of filling is prevented by providing a difference in pressue receiving areas on the spool 21 for the first valve.

13 Claims, 14 Drawing Sheets

APPARATUS FOR CONTROLLING HYDRAULIC PRESSURE FOR CLUTCH

This application is a division of application Ser. No. 07/299,923, filed Nov. 22, 1988, now U.S. Pat. No. 5,035,312.

TECHNICAL FIELD

The present invention relates to an apparatus for controlling a hydraulic pressure usable for a clutch and more particularly to an apparatus of the foregoing type which assures that detection of filling and detection of a clutch pressure are carried out by a simple electronic control type valve arrangement to prevent an occurrence of double engagement with clutches and speed changing is smoothly achieved.

BACKGROUND ART

FIG. 15 illustrates a hitherto widely employed control for speed changing with a transmission. In the illustrated case, speed changing from a first speed to a second speed is taken into account. This conventional control for speed changing is such that a clutch for the first speed is turned off when a command for speed changing is outputted and at the same time a hydraulic oil starts to flow in a clutch for the second speed. Consequently, a hydraulic pressure in the clutch for the first speed is lowered from a predetermined pressure to a level of zero when the command for speed changing is outputted, while a hydraulic pressure in the clutch for the second speed starts to increase gradually after a period of filling time $t_f$ elapses. This filling time $t_f$ designates a period of time required for filling the interior of a clutch pack of the clutch for the second speed with a hydraulic oil.

In this manner, with the conventional apparatus, the time $t_f$ that elapses until the clutch pack is filled with a hydraulic oil is reserved and no torque is transmitted during the period of time $t_f$. This causes a so-called breathing phenomenon to appear during a period of speed changing with the conventional apparatus and the breathing phenomenon gives rise to a problem concerning running performances such as riding comfortability, acceleration characteristic or the like. Particularly, with respect to a large-sized construction machine, a period of filling time is prolonged due to a large capacity of respective clutches, which has a substantial effect on running performances.

In view of the foregoing problems, in the recent years attention has been paid to a crossover control as disclosed in an official gazette of Japanese Laid-Open Patent NO. 13758/1963 and the crossover control has been lately carried out using electronic type pressure control valves. Specifically, according to the prior invention as proposed by the inventors under Japanese Patent Application No. 271055/1985, a crossover control as shown in FIG. 16 is carried out using an electronic modulation system for all clutches to prevent an occurrence of breathing during a period of speed changing due to the presence of filling time.

The proposal as shown in FIG. 16 is such that when a command for speed changing is outputted, a hydraulic oil starts to flow in a clutch for the second speed to be next brought in an engaged state, thereafter when the termination of filling is detected, a clutch for the first speed which has been previously brought in an engaged state is turned off and a build-up control is initiated for the clutch for the second speed.

According to this proposal, an occurrence of breathing phenomenon due to the presence of filling time $t_f$ is not only prevented reliably but also speed changing can be smoothly achieved, resulting in improved running performances being assured. However, to properly carry out such speed changing, it is required that the filling time $t_f$ is exactly detected and an occurrence of double engagement is prevented without fail.

Hitherto, detection of the filling has been performed by properly controlling a pattern with which a hydraulic pressure is gradually increased as time elapses after a command for speed changing is outputted. Specifically, hitherto, a time required for filling the clutch pack with a hydraulic oil is suitably set on the basis of prior experiments, the termination of filling is identified when the set time elapses after a command for speed changing is outputted, and thereafter a hydraulic pressure is increased gradually.

However, it has been found that detecting of the filling having such time control employed therefor can not absorb fluctuation in filling time. For instance, when the clutch pack is filled with a hydraulic oil before the set time elapses, this allows an useless waiting time to be produced, which brings a factor of causing time lag. In addition, since there is a shortage in reliability of detection, a problem is that the aforementioned time control can not be applied to the conventional crossover control for speed changing.

Additionally, according to this crossover control for speed changing, there is a danger that clutches are brought in double engagement, if releasing and engagement timing of clutches located at the preceding stage as well as at the following stages are deviated from correct ones. Accordingly, this becomes a serious problem from the viewpoint of measures to be taken for safety.

However, any particular measure for assuring safety is not taken with the conventional apparatus and this leads to a fear of causing troubles such as damage or injury of components or instruments.

To prevent an occurrence of double engagement, it suffices that an engaged state of the respective clutches can be determined. To this end, there is a need of watching which clutch is filled with a hydraulic oil having a certain intensity of pressure. To provide structural arrangement for the purpose of watching in that way, there has been made a proposal for arrangement of a strain gauge type pressure sensor or a semiconductor type pressure sensor which is available on the commercial basis. However, the proposal has a problem that the commercial pressure sensor is expensive and it has a difficulty in durability. Further, to prevent an occurrence of double engagement, it suffices that whether or not the clutch is filled with a hydraulic oil having a certain intensity of pressure is known. According, a quantitatively detected value derived by a pressure sensor is not required.

The present invention has been made with the foregoing background in mind and its object resides in providing an apparatus for controlling a hydraulic pressure usable for a clutch which assures that detection of filling and detection of presence or absence of a hydraulic pressure for clutches can be exactly attained by a simple and inexpensive structural arrangement.

Other object of the present invention is to provide an apparatus for controlling a hydraulic pressure usable for a clutch which assures that an overshoot pressure generated on the termination of filling is reduced substantially.

Another object of the present invention is to provide an apparatus for controlling a hydraulic pressure usable for a clutch which assures that a shock appearing during a period of speed changing is reduced by smooth speed changing and an occurrence of double engagement with clutches can be prevented without fail.

DISCLOSURE OF THE INVENTION

There is provided in accordance with one aspect of the present invention an apparatus for controlling a hydraulic pressure usable for a clutch comprising a first valve including a spool with an orifice formed at an output port leading to the clutch, the first valve being opened and closed under the effect of a differential pressure appearing across the orifice and a resilient force of a spring, a second valve in the form of a pressure control valve adapted to be activated in response to an electrical signal, the second valve functioning to open the first valve by feeding to the latter a hydraulic oil delivered from a pump during a period of speed changing and gradually increase a hydraulic pressure for the clutch after the termination of filling, and filling detecting means for detecting the termination of filling of the pertinent clutch on the basis of a displacement of the spool for the first valve. The filling detecting means comprises, for instance, a piston member secured to the spool and detecting means for detecting contacting of the piston member with a housing cover of the apparatus and parting of the former away from the latter.

With such construction of the present invention, a hydraulic oil delivered from the pump is first fed to the first valve by allowing the second valve to be opened during a period of speed changing. Then, a differential pressure appears across the orifice and thereby the spool for the first valve is displaced in the direction of opening under the effect of the differential pressure with the result that a hydraulic oil flows in the clutch through the first valve. When the clutch is filled with a hydraulic oil and filling is terminated, the differential pressure across the orifice disappears and the first valve is displaced in the direction of closing by a restorable force of the spring. The filling detecting means detects a displacement of the spool to detect the termination of filling.

In this manner, according to the present invention, the termination of filling is detected by detecting a displacement of the spool adapted to be actuated in dependence on presence or absence of flowing of a hydraulic oil in the clutch. This permits the termination of filling to be detected simply and exactly. Accordingly, crossover control for speed changing can be carried out exactly and safely and thereby speed changing can be smoothly achieved without an occurrence of breathing, resulting in improved running performances being assured.

In addition, there is provided in accordance with other aspect of the present invention an apparatus for controlling a hydraulic pressure usable for a clutch comprising a valve assembly comprising a first valve and a second valve, a clutch pressure detecting switch comprising a piston and a spring and detecting means for detecting a clutch pressure on the basis of a displacement of the piston. The piston is so constructed that a clutch pressure is exerted thereon in one direction and a predetermined intensity of resilient force of the spring energizes it in the opposite direction.

With such construction, when a hydraulic pressure for the clutch becomes larger than the set force of the spring, it overcomes the energizing force of the spring to displace the piston. A displacement of the piston is detected by the aforesaid detecting means. Thus, if the spring is adjusted to a properly set force, the time point when a clutch pressure exceeds the set pressure after the termination of filling can be detected. Additionally, if a clutch pressure detecting switch is provided for the respective clutches and a hydraulic pressure for the respective clutches is monitored in response to a detecting signal transmitted from the detecting means, it can be determined which clutch is held in an engaged state so that presence or absence of a double engagement can be determined. In a case where presence of the double engagement is determined, it suffices that a countermeasure is taken such that all the clutches are turned off immediately or a hydraulic pressure for one of the clutches is lowered.

With such construction, a simple structural arrangement comprising a piston and a spring is incorporated in the apparatus as means for knowing that a clutch is held at an engaged state so that presence or absence of a clutch pressure is determined by detecting a displacement of the piston. This enables detecting to be reliably effected at an inexpensive cost. Further, by monitoring the detecting signal to determine which clutch is brought in an engaged state, an occurrence of double engagement can be detected reliably, and if a proper countermeasure is taken at the time of detection, damage or injury of components or instruments can be prevented.

In addition, according to the present invention, a pressure receiving area of the spool located on the side where a hydraulic pressure is exerted thereon in the direction of closing the first valve is determined larger than that of the spool located on the side where a hydraulic pressure is exerted thereon in the direction of closing of the first valve. It is preferable that a difference in pressure receiving area therebetween becomes larger. By virtue of the difference in pressure receiving area, the spool for the first valve can be quickly returned before the termination of filling and thereby an overshoot pressure can be reduced.

Additionally, there is provided in accordance with another aspect of the present invention an apparatus for controlling a hydraulic pressure usable for a clutch comprising a first valve including a spool with an orifice formed at an output port leading to the clutch, the first valve being opened under the effect of a differential pressure appearing across the orifice and closed under the effect of a restorable force of a first spring disposed on one end of the spool, a second valve in the form of a pressure control valve adapted to be activated in response to an electrical signal, the second valve functioning to open the first valve by feeding to the latter a hydraulic oil delivered from a pump during a period of speed changing and gradually increase a hydraulic pressure for the clutch after the termination of filling, a second spring disposed on the other end side of the spool for the first valve, and detecting means for detecting the termination of filling and a clutch pressure on the basis of a displacement of the spool for the first valve against a resilient force of the second spring.

With such construction, a hydraulic oil delivered from the pump is fed to the first valve by actuating the second valve. Then, the first valve is opened due to the orifice formed in the first valve so that a hydraulic oil flows in the clutch through the first valve. Thereafter, when the clutch is filled with a hydraulic oil, the differential pressure across the orifice disappears, resulting in the first valve being closed under the effect of a restorable force of the spring. After the spool is returned to the neutral position in the course of a return movement, it is displaced further by a hydraulic pressure for the clutch against a resilient force of the spring disposed on the other end side thereof. The detecting means determines the termination of filling and presence or absence of a clutch pressure by detecting a displacement of the spool.

Further, with this construction, if a difference in pressure receiving area is given to the spool for the first valve, the spool is returned under the effect of a restorable force of the spring with a force generated by the difference in pressure receiving area added thereto so that a return speed of the spool can be increased. Consequently, an overshoot pressure appearing on the termination of filling can be reduced.

With such construction, since a spring active in the opposite direction to such a direction that a clutch pressure is exerted on the spool is disposed so as to allow the termination of filling and a clutch engaged state to be detected by a simple structural arrangement comprising this spring and a contact, detection can be reliably attained at an inexpensive cost. In addition, since detecting of the filling is exactly carried out, the aforementioned crossover control can be favorably achieved and moreover running performances can be improved. Additionally, by monitoring the detecting signal to determine which clutch is brought in an engaged state, an occurrence of double engagement can be detected without fail, and if a proper measure is taken, damage or injury of pertinent components or instruments can be prevented.

BEST MODE FOR CARRYING OUT THE INVENTION

Now, the present invention will be described in a greater detail hereunder with reference to the accompanying drawings which illustrate preferred embodiments thereof.

Figure 1:
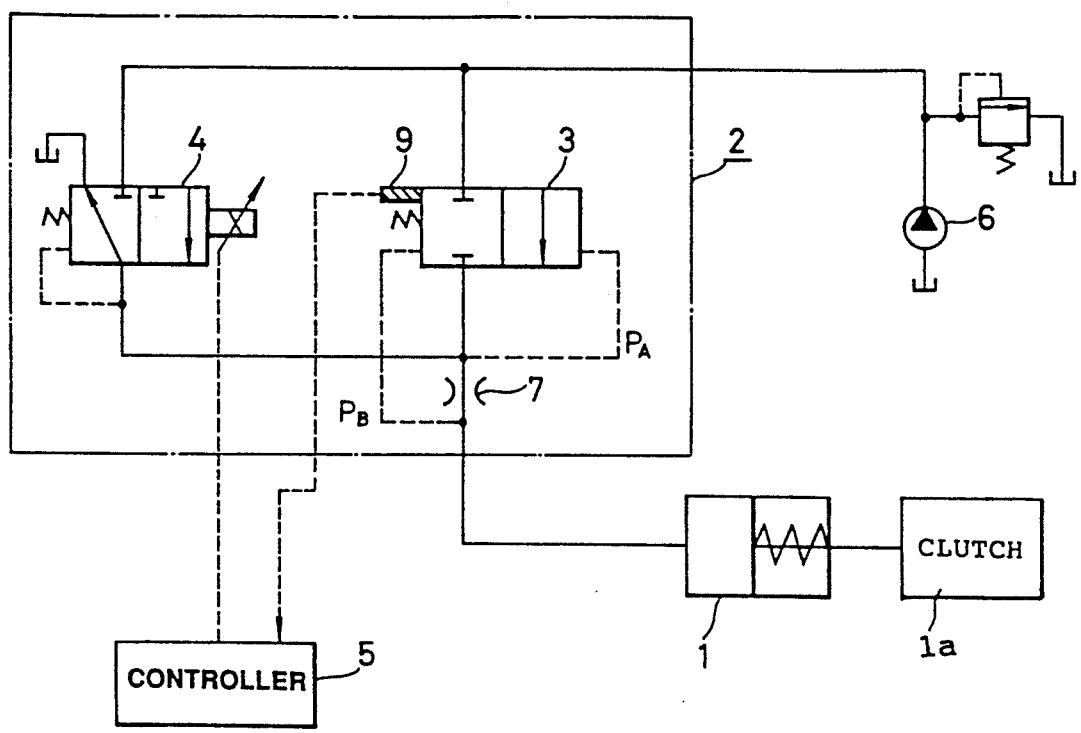
FIG. 1 is a hydraulic circuit illustrating a first embodiment of the present invention.
Figure 2:
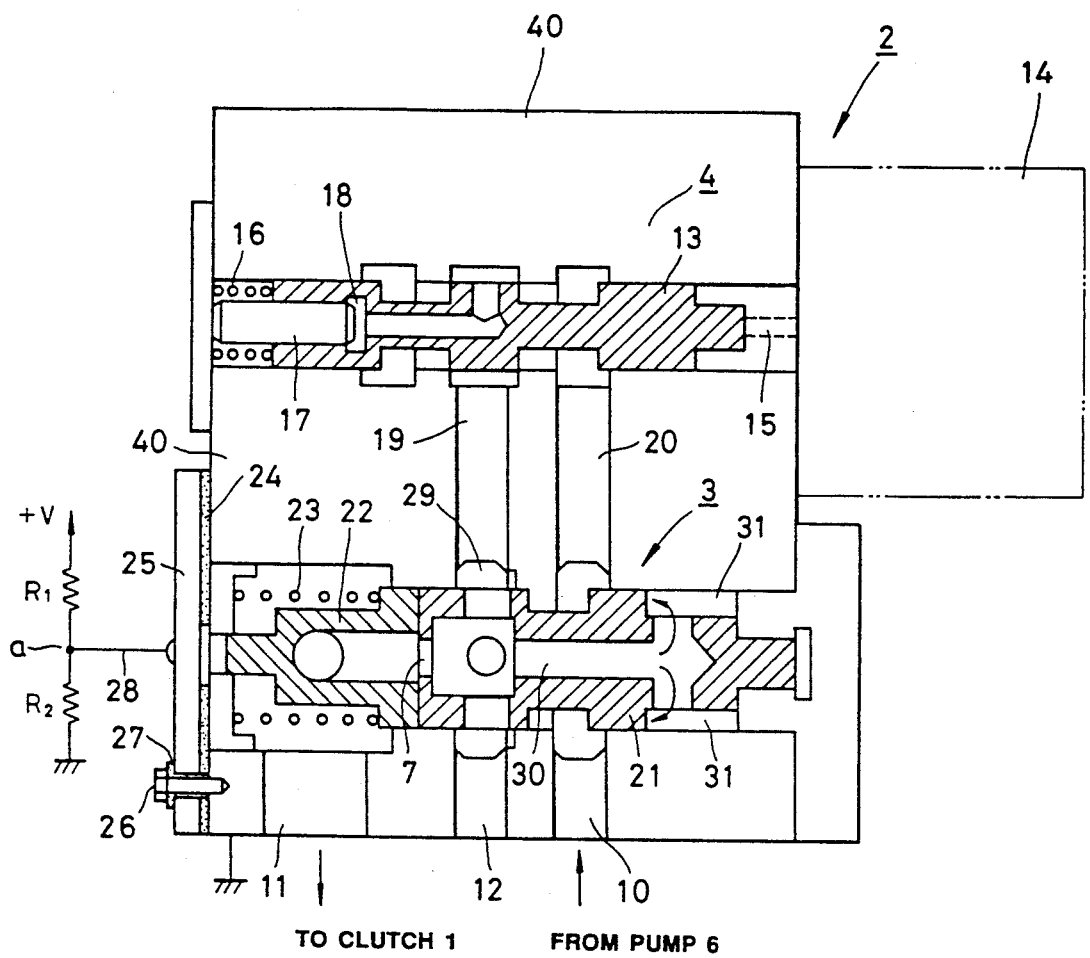
FIG. 2 is a sectional view illustrating by way of example the inner structure of a hydraulic pressure control valve for a clutch in accordance with the first embodiment.

FIGS. 1 and 2 illustrate a first embodiment of the present invention.

FIG. 1 illustrates by way of example a hydraulic circuit for an electronic type hydraulic pressure control valve 2 usable for driving a clutch piston/cylinder 1 of a clutch 1a and FIG. 2 schematically shows a sectional structure of the hydraulic pressure control valve 2.

Referring to FIGS. 1 and 2, the hydraulic pressure control valve 2 comprises a flow rate detecting valve 3, an electronic type pressure control valve 4 and a filling detecting switch 9, and the pressure control valve 4 is driven in response to an electrical signal outputted from a controller 5. The hydraulic pressure control valve 2 allows a hydraulic oil delivered from a pump 6 to flow therein via an input port 10 and feeds it to the clutch piston/cylinder 1 via an output port 11. At this moment, a port 12 is kept closed.

The electronic type pressure control valve 4 includes a spool 13, and the right end of the spool 13 comes in contact with a plunger 15 of a proportional solenoid 14, while the left end of the same is resiliently supported by a coil spring 16. A hydraulic pressure in a hydraulic passage 19 is introduced into a hydraulic chamber 18 defined by the spool 13 and the piston 17.

The flow rate detecting valve 3 includes a spool 21 and an orifice 7 is formed on the output port 11 side of the spool 21. A filling detecting piston 22 is brought in contact with the left end surface of the spool 21 and it is resiliently supported by a spring coil 23.

A cover 25 made of ferrous metallic material is fitted to the left-hand surface of a valve housing 40 with an electrical insulating sheet 24 interposed therebetween. Thus, the cover 25 is electrically isolated from the valve housing 40 in the presence of the insulating sheet 24. Additionally, a plurality of cover fitting bolts 26 are electrically isolated from the cover 25 using a plurality of insulating sleeves 27. The cover 25 has a lead wire 28 connected thereto which in turn is connected to a point a between resistances $R_1$ and $R_2$ which are connected to one another in series. A predetermined intensity of DC voltage (for instance, 12 V) is applied to opposite ends of the resistances $R_1$ and $R_2$. It should be noted that the valve housing 40 is earthed.

With this construction, the piston 22 comes in contact with the housing 40 at all times. However, the piston 22 is not normally brought in contact with the cover 25 made of ferrous metallic material but it comes in contact with the cover 25 when it is displaced in the leftward direction as viewed in the drawing.

In a case where the clutch piston/cylinder 1 is to be brought in an engaged state with the construction as shown in FIGS. 1 and 2, the controller 5 is so activated that a solenoid 14 for the electronic type hydraulic pressure control valve 4 is turned on with a considerably high intensity of electrical current. Consequently, the spool 13 for the pressure control valve 4 is displaced in the leftward direction so that a hydraulic oil delivered from the pump 6 is introduced into the pressure control valve 4 via the input port 10 and the hydraulic passage 20. Hydraulic oil introduced into the pressure control valve 4 flows in the flow rate detecting valve 3 via a hydraulic passage 19 and a port 29 and it flows further in the clutch piston/cylinder 1 via an orifice 7 in the spool 21 and an output port 11. In addition, hydraulic oil introduced through the port 29 is delivered to a hydraulic chamber 31 via a hydraulic passage 30 in the spool 21.

This causes a differential pressure $(P_A - P_B)$ to be generated between the left side of the orifice 7 and the right side of the same, and the flow rate detecting valve 3 assumes an opened position under the influence of the differential pressure by allowing the spool 21 to be displaced in the leftward direction. Consequently, hydraulic oil introduced into the input port 10 flows directly into the port 29 and it is then delivered to the clutch piston/cylinder via the orifice 7.

Figure 3:
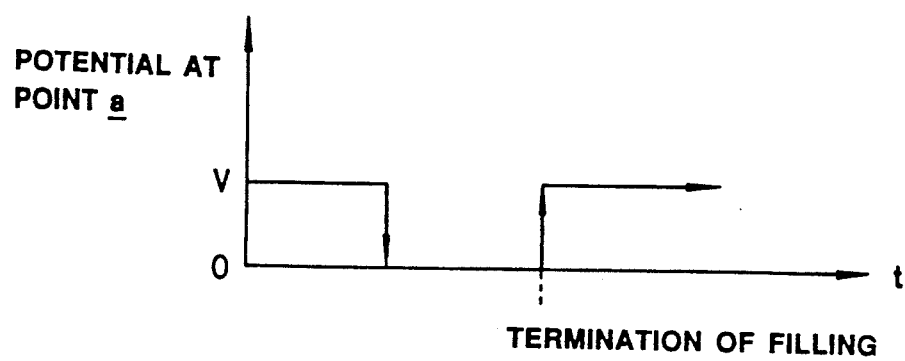
FIG. 3 is a time chart illustrating a timing for detecting the termination of filling.

On the other hand, since the piston 22 is displaced in the leftward direction as the spool 21 is displaced in the leftward direction, the left end surface of the piston 22 is brought in contact with the cover 25. Since the piston 22 comes in contact with the valve housing 40 at this moment, a potential at the point a is lowered to the earthed level as shown in FIG. 3, resulting in no voltage appearing at the point a.

Delivery of a hydraulic oil to the clutch piston/cylinder via the flow rate detecting valve 3 continues until a clutch pack is filled with hydraulic oil. When the clutch pack is completely filled with hydraulic oil, the filling is terminated and this causes no hydraulic oil to flow any more with the result that the differential pressure between the left side of the orifice 7 and the right side of the same disappears. Consequently, the spool 21 in the flow rate detecting valve 3 is displaced in the rightward direction under the effect of a restorable force of the spring 23 so that the flow rate detecting valve 3 is returned to assume a closed state. On the other hand, when the spool 21 is displaced in the rightward direction on the termination of filling, the piston 22 is also displaced in the rightward direction under the effect of resilient force of the spring 23 whereby the left end surface of the piston 22 is parted away from the cover 25, resulting in a voltage V appearing at the point a again. Namely, the time point when the feeling is terminated can be known by detecting the time point when a potential rises at the point a.

A voltage signal derived from the point a is inputted in the controller 5 which in turn detects the rising of the voltage signal to detect the time point when the filling is terminated. When the controller 5 detects the termination of filling by way of the voltage signal, an intensity of electrical current to be fed to the solenoid 14 is gradually increased so that a hydraulic pressure to be exerted on the clutch is gradually increased. Incidentally, the controller 5 is so operated that the spool 13 is displaced by a long distance in the leftward direction by inputting a considerably high intensity of electrical current into the solenoid 14 when speed changing is initiated and thereafter it is kept in a waiting state till the termination of filling while an intensity of electrical current to be inputted is lowered to a suitable initial level. When the controller 5 detects the termination of filling, it gradually increases an intensity of electrical current from this initial level.

In this manner, according to the first embodiment, the termination of filling can be simply and exactly detected by way of the steps of extracting via the piston 22 a displacement of the spool 21 for the flow rate detecting valve 3 adapted to operate in dependence on presence or absence of flowing of a hydraulic oil into the clutch 1, in the form of a movement of the piston 22 for contact with the cover 25 or a movement of the same away from the cover 25 and then electrically detecting the foregoing movement. Incidentally, in this embodiment, the spool 21 is supported by the spring 23 via the piston 22. However, the present invention should not be limited only to this. Alternatively, the spool 21 having the piston 22 secured thereto may be supported directly by the spring 23.

Figure 16:
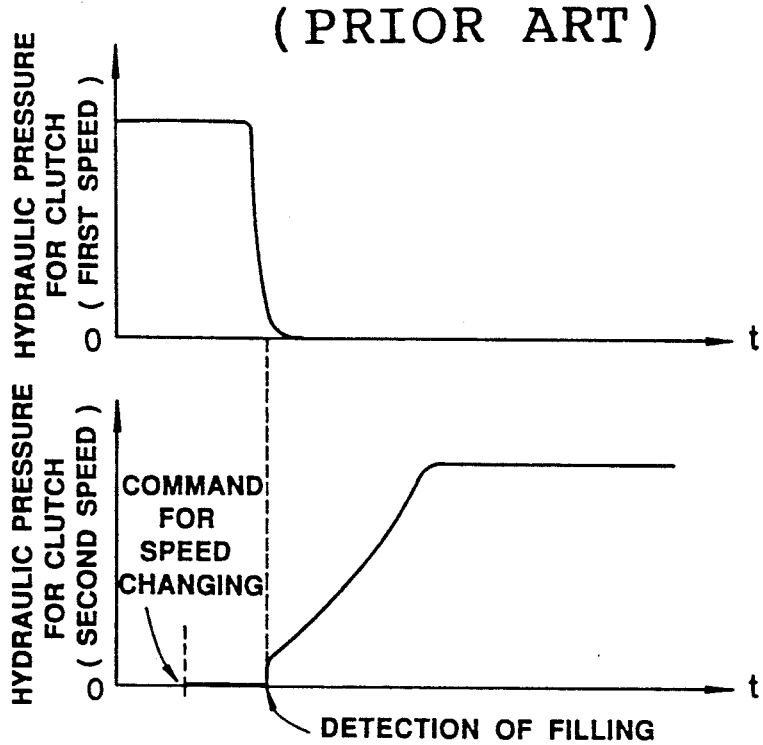
FIG. 16 is time charts illustrating a control for speed changing in accordance with the conventional crossover control system.
Figure 17:
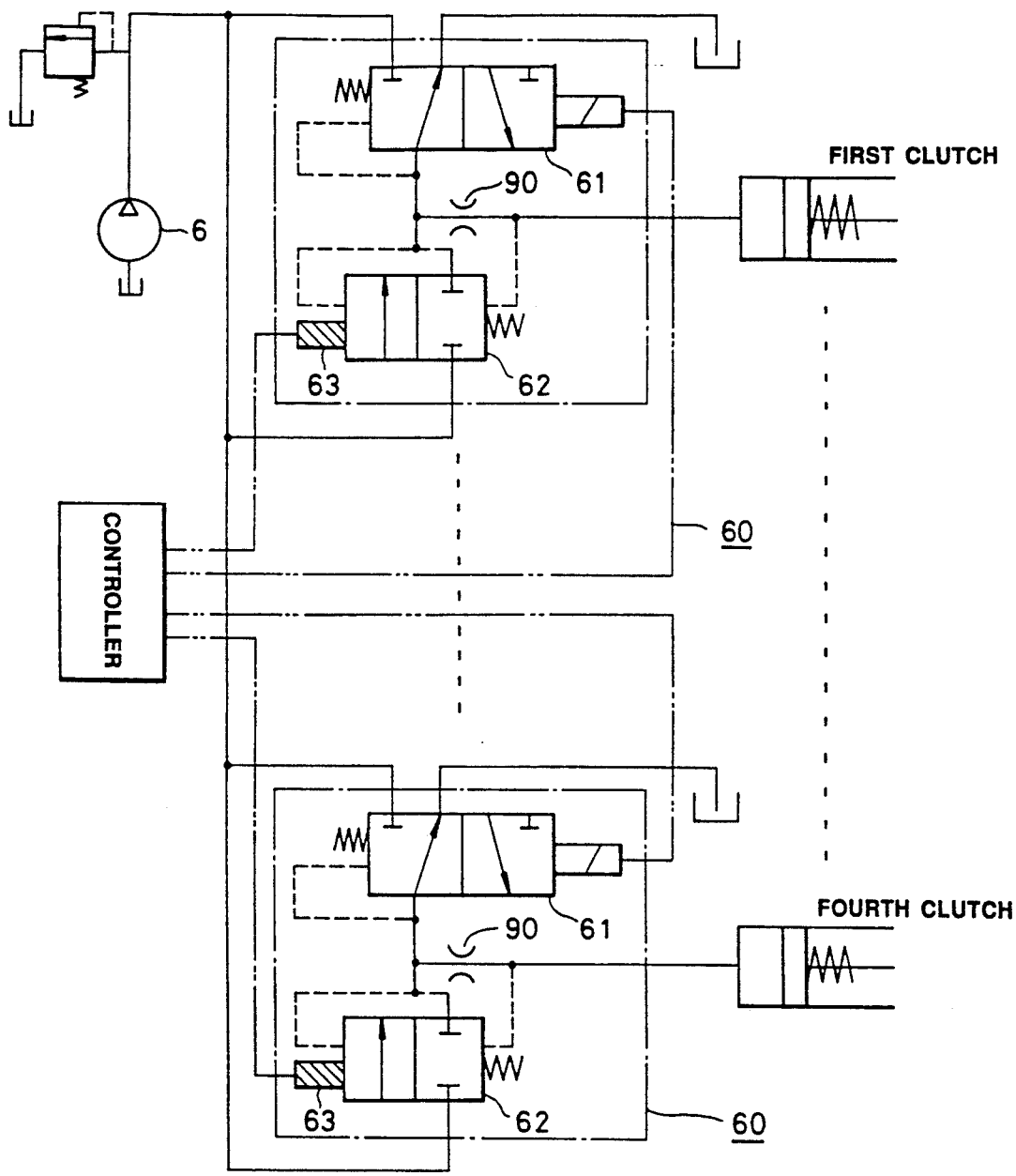
FIG. 17 is a hydraulic circuit illustrating clutches for each of which an electronic type hydraulic pressure control valve is provided.

With this construction, a crossover control for speed changing as shown in FIG. 16 can be carried out reliably. Specifically, it suffices that a hydraulic pressure control valve 2 as constructed in the above-described manner is separately connected to a clutch in the respective speed change stages and that for instance, in a case where speed changing is effected from a first speed to a second speed, a clutch for the second speed is filled with a hydraulic oil just before a clutch for the first speed is disengaged, the clutch for the first speed is disengaged when a potential at a point a on the hydraulic pressure control valve 2 disposed for the clutch for the second speed rises and a clutch pressure for the second speed is then built up by controlling the pressure control valve 4.

Figure 4:
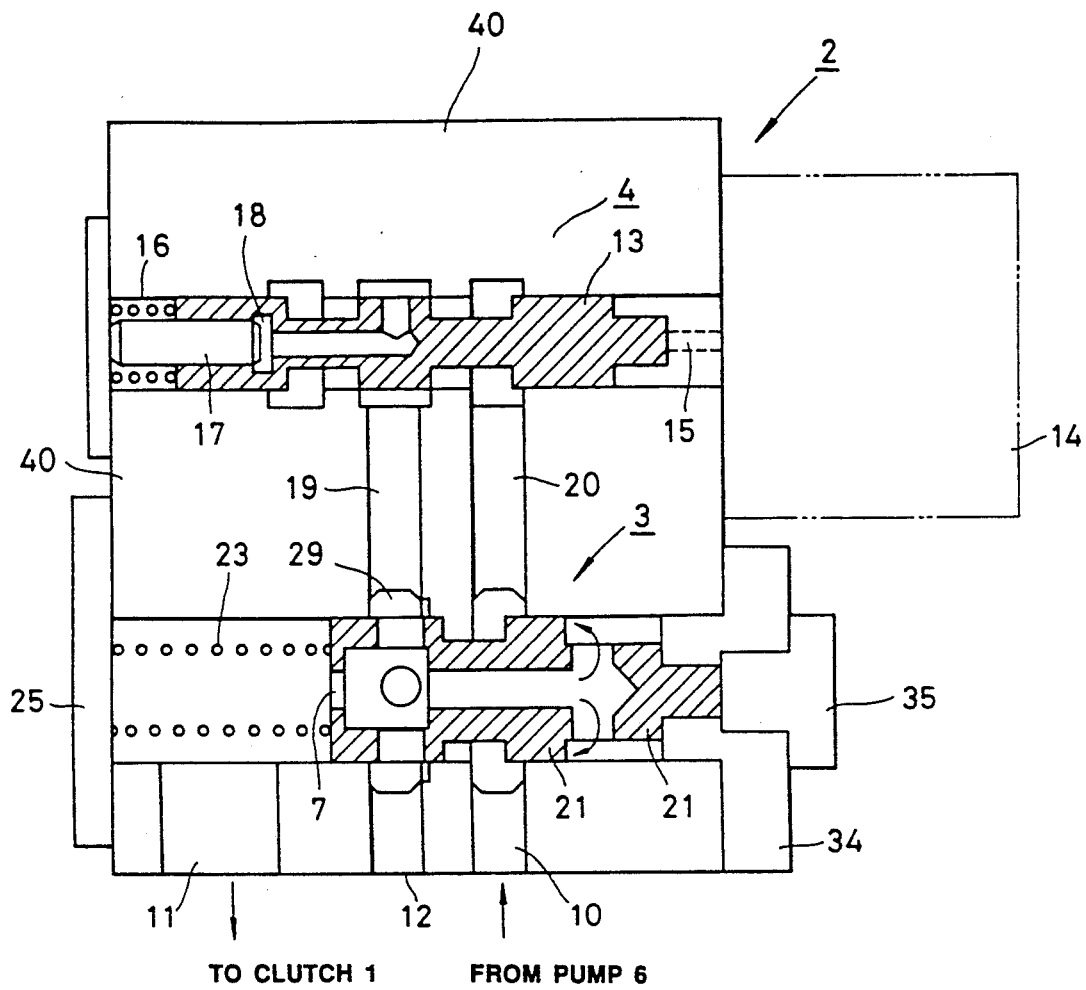
FIG. 4 is a sectional view illustrating a second embodiment of the present invention.

FIG. 4 illustrates a second embodiment of the present invention. This embodiment is such that an electromagnetic pickup 35 is arranged on the housing cover 34 side so that a movement of the spool 21 is detected by the pickup 35. Specifically, an induction voltage generated by the electromagnetic pickup 30 varies as the spool 21 moves and thereby a movement of the spool 21 can be detected by detecting a variation in induction voltage. In this case, since the spool 21 for the flow rate detecting valve 3 is returned to a position as shown in FIG. 4 under the effect of a restorable force of the spring 23 when the clutch pack is filled with a hydraulic oil in the same manner as in the foregoing embodiment, the termination of filling can be exactly detected by detecting the return movement of the spool 21 with the aid of the electromagnetic pickup 30.

Figure 5:
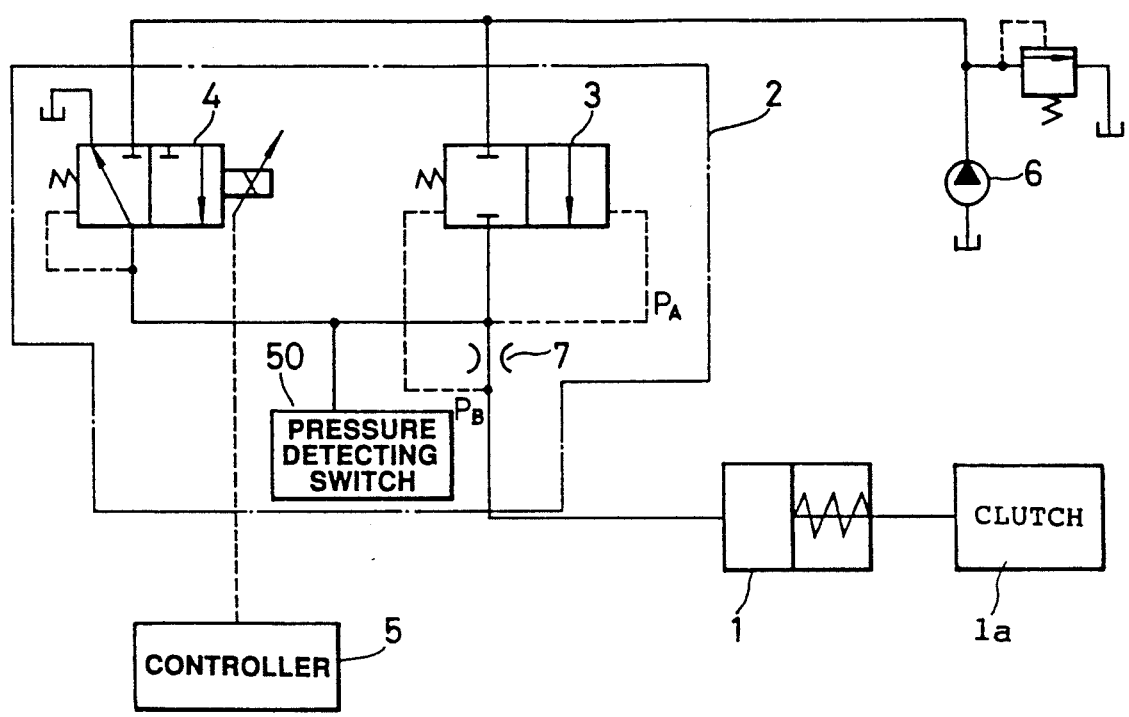
FIG. 5 is a hydraulic circuit illustrating a third embodiment of the present invention.
Figure 6:
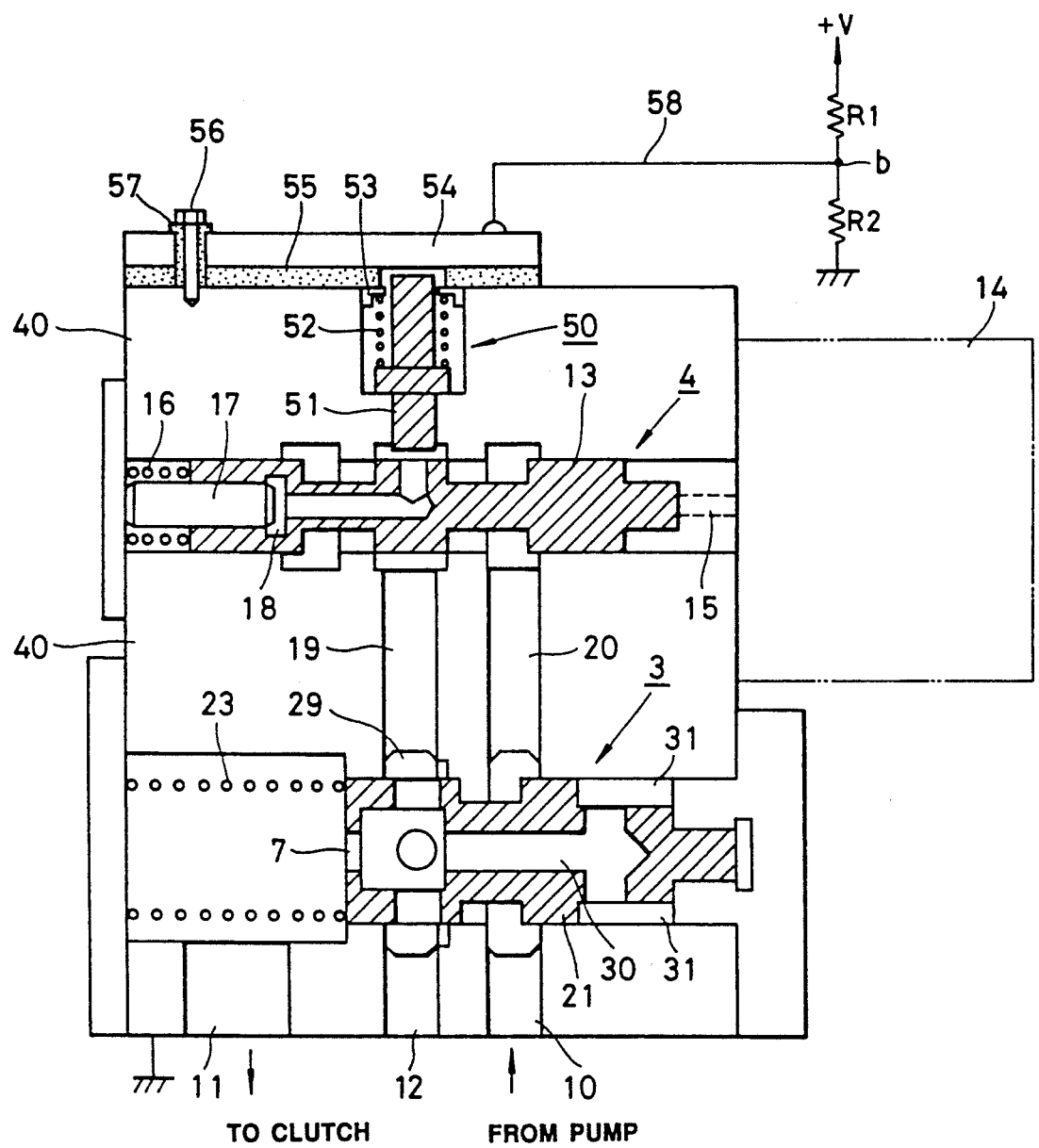
FIG. 6 is a sectional view illustrating the inner structure of a hydraulic pressure control valve for a clutch in accordance with the third embodiment.

FIGS. 5 and 6 illustrate a third embodiment of the present invention and same or similar components to those in the foregoing embodiments are identified by same reference numerals. Thus, repeated description will not be required.

Referring to FIGS. 5 and 6, the hydraulic pressure control valve 2 for a pertinent clutch is equipped with a pressure detecting switch 50 besides the flow rate detecting valve 3 and the electronic type pressure control valve 4 as constructed in the same manner as in the foregoing embodiments.

In this case, the pressure control valve 4 includes the same spool 13 as that in the foregoing embodiments and the right end of the spool 13 comes in contact with a plunger 15 of the proportional solenoid 14, while the left end of the same is resiliently supported by a coil spring 16. A hydraulic pressure in the hydraulic passage 19 is introduced into a hydraulic chamber 18 defined by the spool 13 and the piston 17.

Similarly, the flow rate detecting valve 3 includes the same spool 21 as that in the foregoing embodiments. An orifice 7 is formed on the output port 11 side of the spool 21 and the left-hand end of the spool 21 is resiliently supported by a coil spring 23.

The pressure detecting switch 50 is provided at the upper end of the hydraulic passage 19 to detect a clutch pressure. The pressure detecting switch 50 comprises a pressure detecting piston 51 and a coil spring 52 for resiliently supporting the piston 51.

The spring 52 is adapted to energize the piston 51 via a spring guide 53 under the effect of a resilient force thereof of which intensity is so determined that the piston 51 is not pushed back when a hydraulic pressure for the clutch, that is, a hydraulic pressure in the hydraulic passage 19 is lower than a predetermined set pressure Th (for instance, 5 Kg/cm$^2$). The piston 51 contacts a valve body 40 but normally does not contact a cover 54 of ferrous metallic material placed on the upper surface of the valve body 40. When the piston 51 is displaced upwardly against a resilient force of the spring 52, it is brought in contact with the cover 54. The cover 54 made of ferrous metallic material is electrically isolated from the body in the presence of an insulating sheet 55 interposed therebetween. Additionally, cover fitting bolts 56 are kept in an electrically isolated state from the cover 54 in the presence of insulating sleeves 57 fitted therethrough.

A lead wire 58 is extended from the cover 54 so that it is connected to a point b between resistances $R_1$ and $R_2$ which are connected to one another in series. A predetermined magnitude of DC voltage V (for instance, 12 V) is applied to the point b and the valve body 40 is earthed.

The hydraulic pressure control valve 2 as constructed in the above-described manner is connected to a clutch for the respective speed change stages and each of the control valves 2 is equipped with the aforementioned pressure detecting switch 50.

Figure 7:
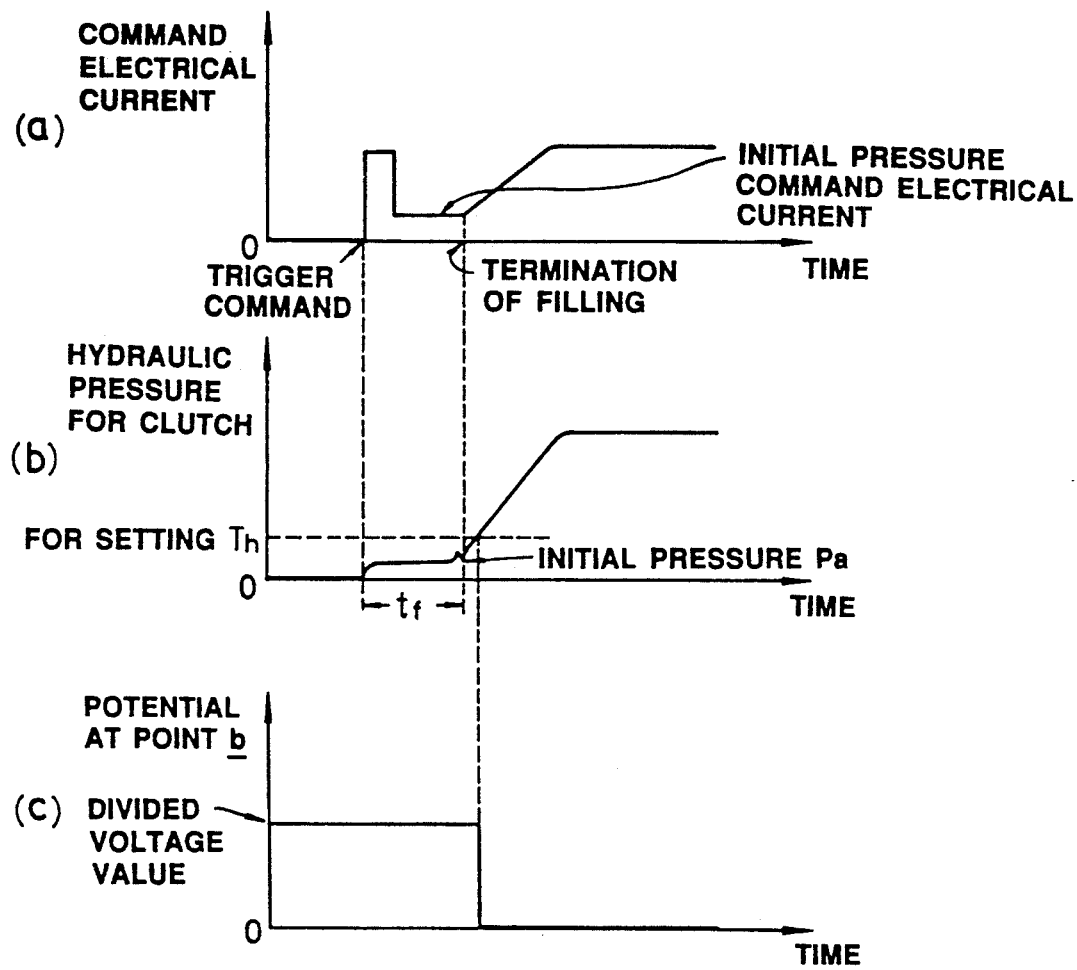
FIG. 7 is time charts illustrating by way of example operation of the hydraulic pressure control valve in accordance with the third embodiment respectively.

Next, operation of the apparatus constructed as illustrated in FIGS. 5 and 6 will be described below with reference to time charts as shown in FIG. 7. In a case where it is required that the clutch 1 communicated with the hydraulic pressure control valve 2 is brought in an engaged state, the controller 5 is activated to input a trigger command to the solenoid 14 of the control valve 2 (see FIG. 7(a)). Incidentally, after the trigger command has been inputted in that way, the controller 5 is kept in a waiting state till the termination of filling while an intensity of command electrical current is lowered to a level indicative of a value of initial pressure command electrical current corresponding to an initial pressure Pa of the hydraulic pressure for the pertinent clutch.

The spool 13 in the pressure control valve 4 is displaced in the leftward direction in response to inputting of the trigger command and a hydraulic oil discharged from the pump 6 is introduced into the pressure control valve 4 via the input port 10 and the hydraulic passage 20. Hydraulic oil introduced into the pressure control valve 4 flows in the flow rate detecting valve 3 via the hydraulic passage 19 and the port 29 and thereafter it flows in the clutch 1 via the orifice 7 and the output port 11. Additionally, hydraulic oil introduced through the port 29 is delivered to the hydraulic chamber 31 via the hydraulic passage 30 formed in the spool 21.

Then, a differential pressure $(P_A - P_B)$ is generated between the right side of the orifice 7 and the left side of the same and the spool 21 is displaced in the leftward direction under the influence of the differential pressure so that the flow rate detecting valve 3 is kept open. Consequently, hydraulic oil introduced through the input port 10 enters directly into the port 29 and it flows further in the clutch 1 via the orifice 7. Flowing of hydraulic oil in that way continues until the clutch pack is completely filled with hydraulic oil.

During a period of filling time $t_f$ that elapses until the clutch pack is filled with hydraulic oil, a hydraulic pressure in the clutch pack is maintained substantially at a level of zero as shown in FIG. 7(b) and it does not reach the pressure Th set by the spring 52, resulting in the upper end surface of the pin 51 of the pressure detecting switch 50 failing to come in contact with the cover 54 made of ferrous metallic material. While this operative state is maintained, a potential appearing at the point b assumes a value of voltage derived by dividing the voltage V by the resistances $R_1$ and $R_2$, as shown in FIG. 7(c).

When the clutch pack is filled with hydraulic oil, the filling is terminated and no hydraulic oil flows any more. Thus, the differential pressure generated across the orifice 7 disappears with the result that the spool 21 in the flow rate detecting valve 3 is displaced in the rightward direction under the effect of a resilient force of the spring 23 and thereby the flow rate detecting valve 3 is returned to the closed state. After the filling is terminated, the controller 5 is so activated that an electrical current to be fed to the solenoid 14 is gradually increased from the value of command electrical current representative of the initial pressure, as shown in FIG. 7(a).

This permits a hydraulic pressure for the pertinent clutch to be gradually increased from the initial pressure Pa (for instance, about 2 Kg/cm$^2$), as shown in FIG. 7(b). Since the pressure Th set for the spring 52 is set appreciably larger than the initial pressure Pa, the hydraulic pressure causes the pressure detecting piston 51 to be displaced upwardly against the resilient force of the spring 52, when it is in excess of the set value Th. Consequently, the upper end surface of the piston 51 is brought in contact with the cover 54. This allow the cover 54 made of ferrous metallic material to be electrically conducted to the earthed body 40 via the piston 51, resulting in the potential at the point b being lowered to a level of zero, as shown in FIG. 7(c). Thus, no voltage appears at the point b.

According to the third embodiment, presence or absence of a hydraulic pressure in the clutch pack is recognized in the form of a movement of the pressure detecting piston 51 at the upper end of the hydraulic passage 19 in contact with the cover 54 or a movement of the former away from the latter so that a movement of the piston 51 in contact with the cover 54 or a movement of the former away from the latter can be electrically detected via variation in voltage at the point b.

Accordingly, presence or absence of a hydraulic pressure for the pertinent clutch can be known by examining presence or absence of a potential at the point b.

Figure 8:
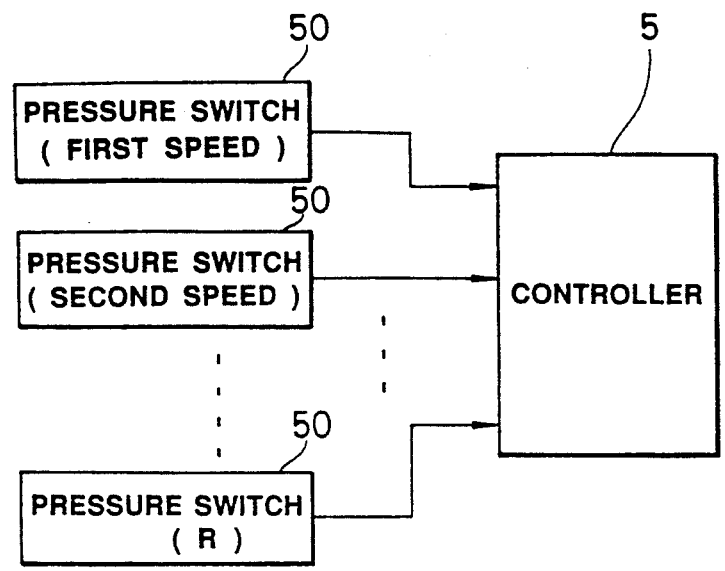
FIG. 8 is a block diagram illustrating a structural arrangement to be monitored by a pressure detecting switch.

Additionally, according to this embodiment, an electronic type hydraulic pressure control valve 2 having the aforementioned pressure detecting switch 50 incorporated therein is provided for the respective clutches and outputs from the plural pressure detecting switches 50 are inputted in the controller 5, as shown in FIG. 8. The controller 5 monitors outputs from the plural pressure detecting switches 50 and then makes a determination on the basis of the result derived from monitoring as to whether double engagement is made or not. Namely, which clutch is kept in an engaged state can be recognized by monitoring outputs from the plural pressure switches 50, and in a case where clutch pressure detecting signals are simultaneously outputted from two pressure switches 50, this can be determined as double engagement. When the controller 50 has determined that double engagement is made, it takes a countermeasure such that a command is outputted to reduce a hydraulic pressure in one of the clutches immediately or turn off all the clutches immediately in order to prevent pertinent components or instruments from being damaged or injured due to an occurrence of double engagement.

Figure 9:
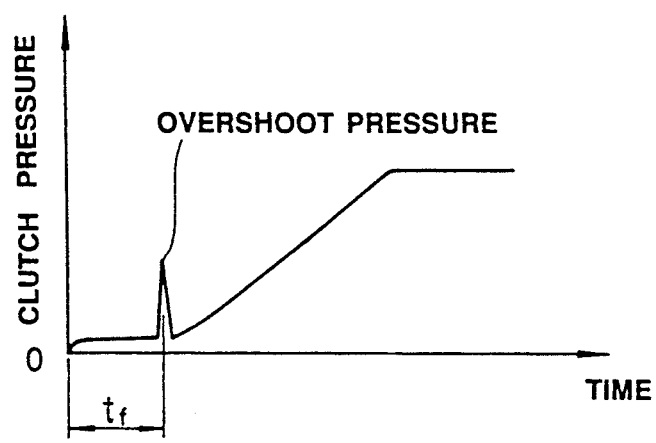
FIG. 9 is a time chart illustrating a clutch pressure during a period of speed changing in which an overshoot pressure is generated.

Indeed, with respect to the hydraulic pressure control valve 2 as shown in FIG. 6, it has been found that when the spool 21 for the flow rate detecting valve 3 is closed after the filling time $t_f$ elapses, an overshoot pressure as shown in FIG. 9 is generated and this gives rise to a factor that a shock occurs during a period of speed changing or an abnormal sound is generated. Unless this overshoot pressure is reduced, any effort becomes useless which is intended to reduce a shock due to speed changing by carrying out torque compensation using the electronic type hydraulic pressure control valve. Accordingly, reduction of the overshoot pressure becomes a serious problem. To absorb the overshoot pressure, there has been proposed a method of providing an accumulator. However, problems arise that this method is practiced at an expensive cost and moreover structure in the proximity of the valve is enlarged and complicated. For the reason, the conventional method fails to be put in practical use.

As results derived from a variety of research works conducted by the inventors with the foregoing problems in mind, it has been found that the overshoot pressure is generated when a return speed of the spool 21 in the flow rate detecting valve 3 is slow during a period in which the spool 21 returns (moves in the rightward direction) after the termination of filling. In this connection, an usual flow rate detecting valve 3 is so designed that a pressure receiving area $A_1$ of the spool 21 in the hydraulic chamber 31 is substantially equal to a pressure receiving area $A_2$ on the left-hand end surface of the same. Namely, with such construction as shown in FIG. 6, since the spool 21 is returned only by a restorable force of the spring 23 when the differential pressure between the left side of the orifice 7 and the right side of the same disappears, the result is that a speed of its return movement is slow and a certain time delay occurs until the spool 21 is completely closed.

Figure 10:
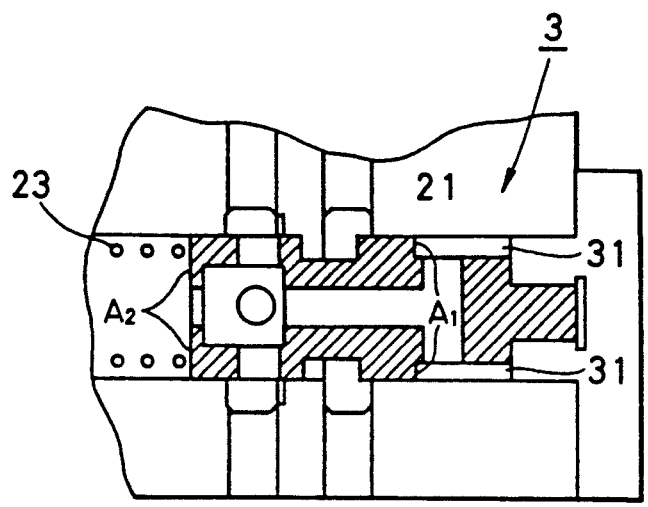
FIG. 10 is a fragmental enlarged view illustrating a fourth embodiment of the present invention.

To obviate the foregoing problems, the present invention provides a fourth embodiment. According to the fourth embodiment, as shown in FIG. 10, a certain amount of difference is provided between the pressure receiving area $A_2$ at the left end of the spool 21 and the pressure receiving area $A_1$ of the same in the hydraulic chamber 31 in such a manner that the pressure receiving area $A_2$ on the left end surface of the spool 21 is larger than the pressure receiving surface $A_1$ of the same in the hydraulic chamber 31 and an equation as represented by $A_2 = 2A_1$ is established therebetween.

Here, when it is assumed that a pressure before the orifice 7 is represented by $P_A$ and a pressure behind the same is represented by $P_B$ as shown in FIG. 5, a differential pressure $\Delta P$ appearing across the orifice 7 is represented by $\Delta P = P_A - P_B$.

Accordingly, a force exerted on the left-hand end surface of the spool 21 is represented by $A_2 P_B$ and a force exerted on the spool 21 in the leftward direction in the presence of a hydraulic pressure in the hydraulic chamber 31 is represented by $A_1 P_A$.

Namely, a force F as represented by the following formula is exerted on the spool 21 in the rightward direction.

$$\begin{aligned} F &= A_2 P_B - A_1 P_A \\ &= 2A_1 P_B - A_1 P_A \\ &= A_1(2P_B - P_A) \end{aligned} \quad (1)$$

Now, it is assumed that the differential pressure $\Delta P$ becomes zero on the termination of filling. At this moment, $P_A$ becomes equal to $P_B$ and therefore the formula (1) is modified in the form of $F = A_1 P_A$. Thus, this force F is exerted on the spool 21 in the rightward direction, that is, in the direction of closing of the spool 21. It should be noted that $P_A$ is not reduced completely to zero due to resistance existent throughout piping, return spring in the clutch or the like.

Consequently, in this case, when the filling is terminated, the spool 21 is returned under the effect of a force represented by a return force of the spring 23 with a force $F = A_1 P_A$ added thereto, resulting in the spool 21 being closed at a high speed.

Figure 11:
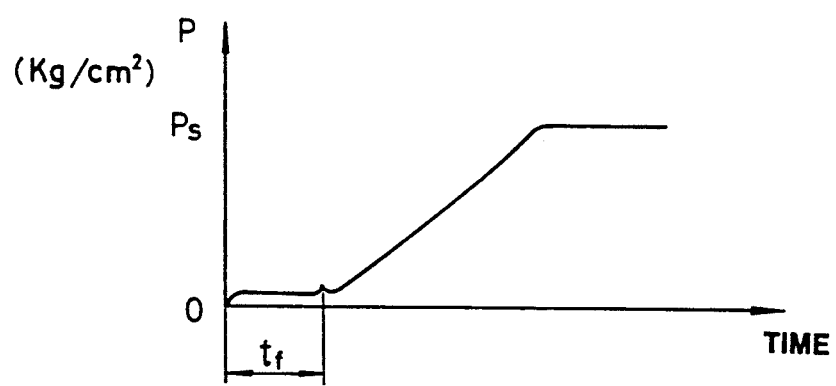
FIG. 11 is a time chart illustrating a clutch pressure during a period of speed changing in accordance with the fourth embodiment.

FIG. 11 is a time chart illustrating a relationship of time vs. hydraulic pressure for a pertinent clutch in the valve constructed as shown in FIG. 10. With such valve construction, an overshoot pressure appearing after the filling time $t_f$ elapses can be adequately reduced, as shown in FIG. 11.

Namely, the valve construction shown in FIG. 10 assures that the overshoot pressure is reliably reduced by such simple and inexpensive improvement that the pressure receiving area $A_2$ of the spool located on the side where a force is exerted in the direction of closing of the flow rate detecting valve 3 is determined larger than the pressure receiving area $A_1$ of the same located on the side where a force is exerted in the direction of opening of the flow rate detecting valve 3 (it is preferable that a difference in area therebetween is larger).

Figure 12:
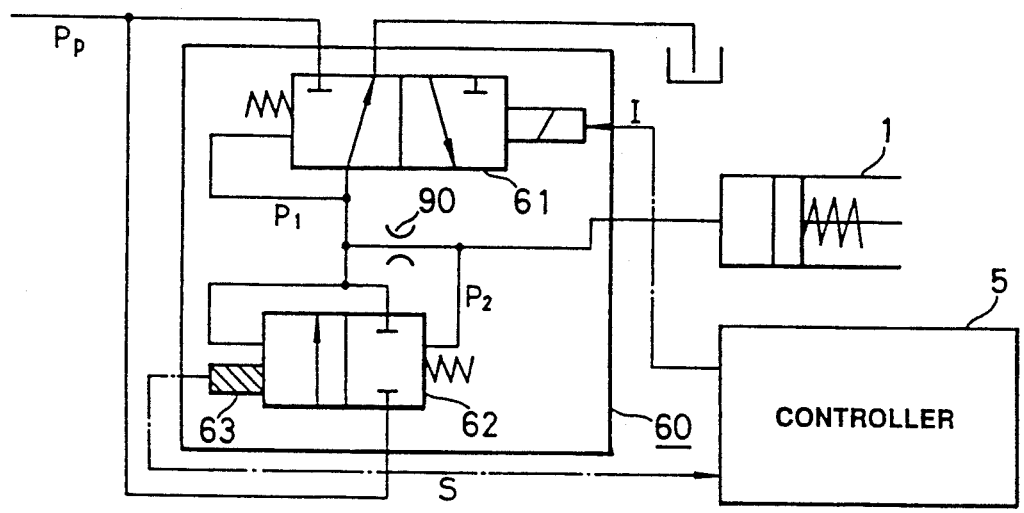
FIG. 12 is a hydraulic circuit illustrating a fifth embodiment of the present invention.
Figure 13:
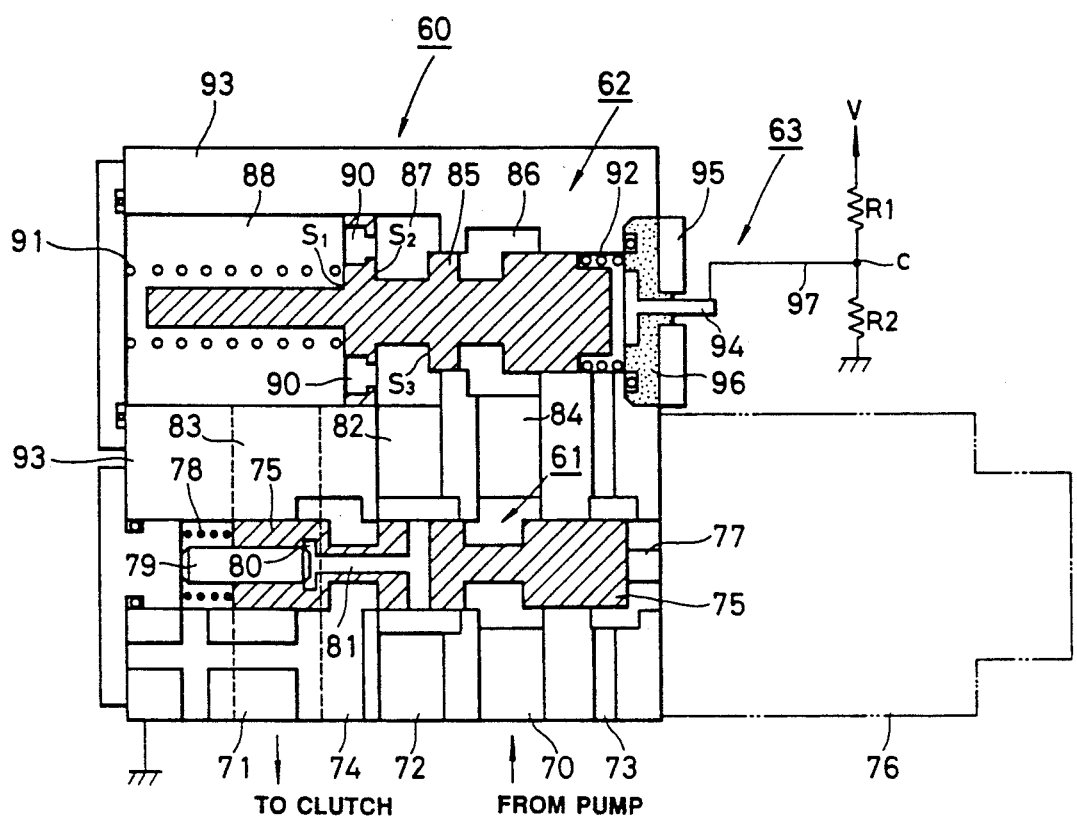
FIG. 13 is a sectional view illustrating by way of example the inner structure of a hydraulic pressure control valve for a clutch in accordance with the fifth embodiment.

FIGS. 12 and 13 illustrate a fifth embodiment of the present invention. This embodiment is such that both functions comprising a filling detecting function provided in accordance with the first and second embodiments and a clutch pressure detecting function provided in accordance with the third embodiment are attained by a single sensor construction.

Specifically, referring to FIGS. 12 and 13, a hydraulic pressure control valve 60 comprises a pressure control valve 61 for controlling a hydraulic pressure usable for a clutch, a flow rate detecting valve 62 and a sensor section 63 for detecting a filling and a clutch pressure.

The pressure control valve 61 is controlled by a controller 5, and a detection signal S from the sensor section 63 is inputted in the controller 5.

A hydraulic oil delivered from a pump which is not shown in the drawings is introduced into the hydraulic pressure control valve 60 via an input port 70 and it is then fed to the clutch piston/clutch 1 via an output port 71. At this moment, a port 72 is kept closed and ports 73 and 74 represent a drain port respectively.

The electronic type pressure control valve 61 includes a spool 75 of which right end comes in contact with a plunger 77 of a proportional solenoid 76, and a coil spring 78 is disposed at the left end of the spool 75. Additionally, a hydraulic pressure in a hydraulic passage 82 is introduced via a hydraulic passage 81 into a hydraulic chamber 80 defined by the spool 75 and the piston 79.

The flow rate detecting valve 62 includes a spool 85 which defines hydraulic chambers 86, 87 and 88. An orifice 90 is formed between both the hydraulic chambers 87 and 88. The spool 85 is so constructed that it has three different pressure receiving areas $S_1$, $S_2$ and $S_3$ which have a relationship among them as represented by $S_1+S_3>S_2$ and $S_2>S_3$. A coil spring 91 is disposed at the left end of the spool 85 and another coil spring 92 is disposed at the right-hand end of the same. When no hydraulic pressure is introduced into the hydraulic chambers 87 and 88, the spool 85 is maintained at a neutral position shown in FIG. 12 where both the springs 91 and 92 have their free length. Accordingly, when the spool 85 is held at a neutral state, a hydraulic oil which flows in the flow rate detecting valve 62 from a hydraulic passage 84 via the input port 70 is caused to stay in the hydraulic chamber 86.

Here, when it is assumed that spring constants of the springs 91 and 92 are represented by $k_1$ and $k_2$, hydraulic pressures in the hydraulic chambers 87 and 88 are represented by $P_1$ and $P_2$ and a displacement of the spool 85 from the neutral position is represented by x, a force $F_1$ represented by the following formula (2) is exerted on the spool 85 in the rightward direction when the spool 85 is located leftward of the neutral position shown in FIG. 13.

$$F_1 = k_1 x + S_1 P_2 + P_1(S_3 - S_2) \qquad (2).$$

On the contrary, when the spool 85 is located rightward of the neutral position, a force $F_2$ represented by the following formula (3) is exerted on the spool 85 in the leftward direction.

$$F_2 = k_2 x - S_1 P_2 - P_1(S_3 - S_2) \qquad (3).$$

Incidentally, in this case, $k_2 > k_1$ is assumed. Specifically, in this case, the spring 91 functions as a return spring for the spool 85 and the spring 92 functions as a pressure setting spring for the purpose of detecting a hydraulic pressure for the clutch.

A detecting pin 94 made of metallic material is disposed on the upper right side of the valve body 93 in order to detect that the spool 85 is displaced further rightward of the neutral position shown in FIG. 13 against a resilient force of the spring 92. The detecting pin 94 is attached to the valve body 93 by means of a cover 95 in the presence of an electrical insulating sheet 96 and a lead wire 97 is extended from the detecting pin 94.

The lead wire 97 is connected to a point c between resistances $R_1$ and $R_2$ which in turn are connected to one another in series. A predetermined magnitude of DC voltage V (for instance, 12 V) is applied to the resistances $R_1$ and $R_2$ therebetween and the valve body 93 is earthed. Namely, the sensor 63 for detecting a filling and a hydraulic pressure for the pertinent clutch comprises the spring 92, the detecting pin 94 serving as a contact on the spool 85 and the resistances $R_1$ and $R_2$.

The hydraulic pressure control valve 60 having the sensor section 63 used therefor is disposed individually for clutches for respective speed change stages.

Figure 14:
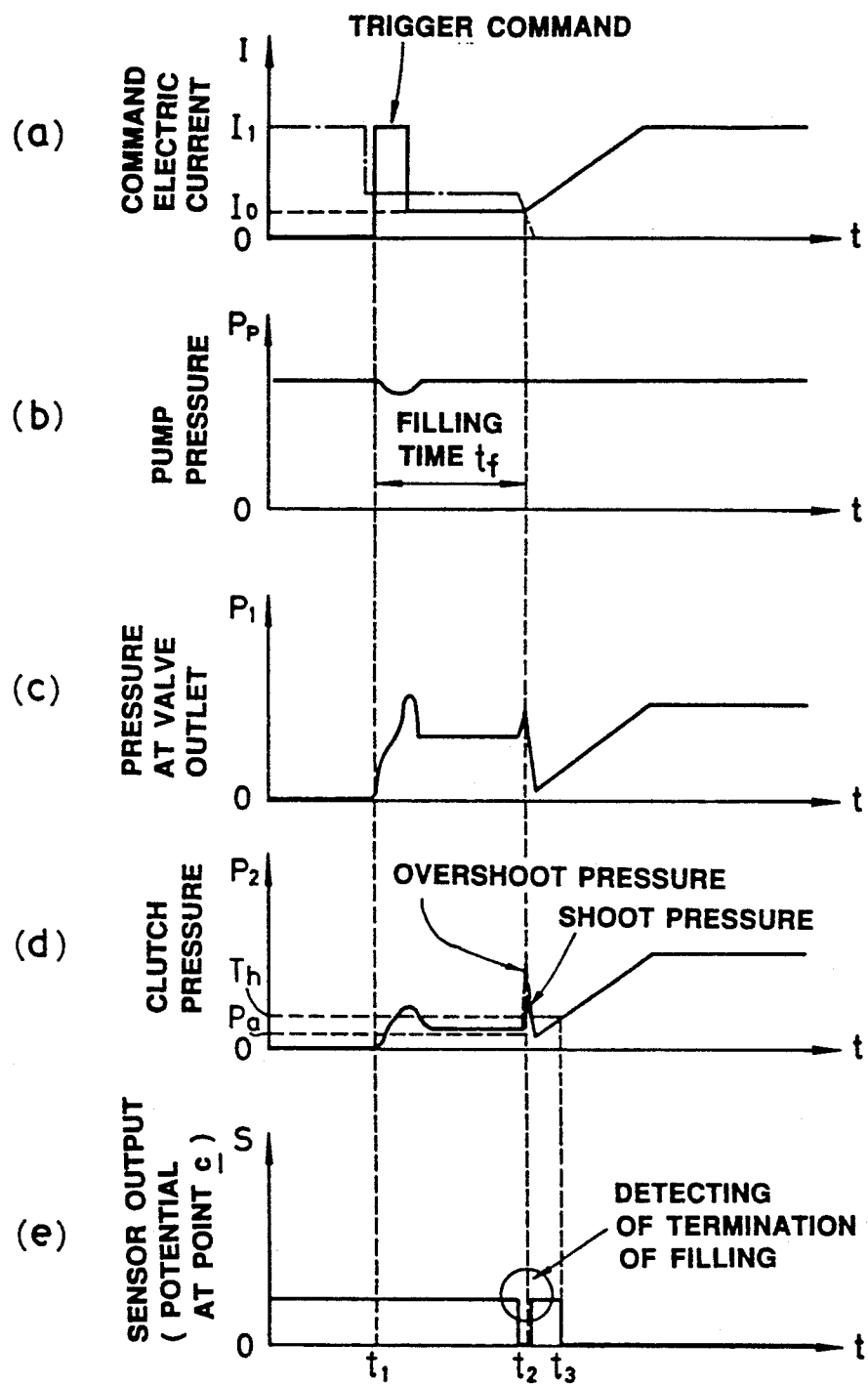
FIG. 14 is time charts illustrating by way of example operation of the hydraulic pressure control valve in accordance with the fifth embodiment respectively.
Figure 15:
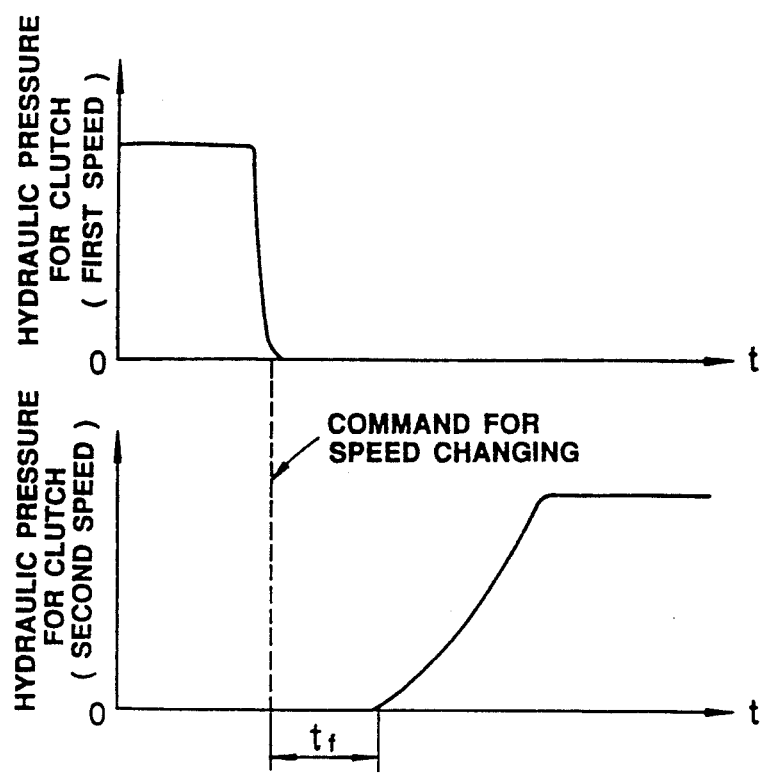
FIG. 15 is time charts illustrating a conventional control for speed changing respectively.

Next, operation of the apparatus constructed as illustrated in FIGS. 12 and 13 will be described below with reference to time charts as shown in FIG. 14. It should be noted that FIG. 14(a) shows a command electrical current I from the controller 5, FIG. 14(b) does a pump pressure $P_p$, FIG. 14(c) does a hydraulic pressure $P_1$ in the hydraulic chamber 87 before the orifice 90, FIG. 14(d) does a hydraulic pressure (clutch pressure) $P_2$ in the hydraulic chamber 88 behind the orifice 90 and FIG. 14(e) does an output S from the sensor 63.

When it is required that a clutch allocated to a certain speed change stage is brought in an engaged state, the controller 5 is so activated that a trigger command electrical current $I_1$ is inputted in the solenoid 76 of the pertinent valve 60 (time $t_1$), a command electrical current I is later lowered to an initial pressure command electrical current $I_o$ corresponding to an initial pressure Pa for the hydraulic pressure for the pertinent clutch (FIG. 14(d)) and it is then held in a waiting state till the termination of filling while the foregoing operative state is maintained.

As the trigger command electrical current $I_1$ is inputted in that way, the spool 75 in the pressure control valve 61 is displaced in the leftward direction and a hydraulic oil delivered from the pump flows in the hydraulic chamber 87 of the flow rate detecting valve 62 via the input port 70 and the hydraulic passage 82. Hydraulic oil introduced into the hydraulic chamber 87 flows in the hydraulic chamber 88 via the orifice 90 and it flows further in the clutch Piston/cylinder 1 via the hydraulic passage 83 and the output port 71. At this moment, a differential pressure $(P_1-P_2)$ is generated between both the hydraulic chambers 87 and 88 due to the provision of the orifice 90. Here, since the pressure $P_2$ is approximately equal to zero, the spool 85 is displaced in the leftward direction under the effect of a force represented by $(S_2-S_3) P_1 - k_1 x$ (where $S_2$ is larger than $S_3$) which is derived by inserting a condition of $P_2=0$ in the formula (2).

As a result, the flow rate detecting valve 62 is opened so that hydraulic oil introduced into the hydraulic passage 84 flows in the hydraulic chamber 87 via the hydraulic chamber 86 and thereafter it flows further in the clutch i via the orifice 90, the hydraulic chamber 88, the hydraulic passage 83 and the output port 71. The flowing of hydraulic oil continues until the clutch pack is completely filled with hydraulic oil.

Here, when the spool 85 is held at the neutral position shown in FIG. 13 as well as during a period of filling time $t_f$ in which the spool 85 is displaced leftward of the neutral position, the spool 85 is parted away from the detecting pin 94.

As long as the foregoing operative state is maintained, a potential appearing at the point c assumes a value of voltage which is derived by dividing the voltage V by the resistances $R_1$ and $R_2$, as shown in FIG. 14(e).

When the clutch pack is filled with oil, the filling is terminated and no hydraulic oil flows any more. Thus, the differential pressure across the orifice 90 disappears. Namely, pressure $P_1$ becomes equal to pressure $P_2$.

Consequently, the spool 85 is displaced in the rightward direction under the effect of a force derived from inserting a condition of $P_1 = P_2$ in the formula (2), that is, a force represented by the following formula, until it is returned to the neutral position.

$$F_1 = K_1 x + P_2(S_1 + S_3 - S_2).$$

Here, since the respective pressure receiving areas $S_1$, $S_2$ and $S_3$ on the spool 85 are set in accordance with a relationship represented by $S_1 + S_3 > S_2$, a force $P_2 (S_1 + S_3 - S_2)$ generated due to a difference in pressure receiving area is exerted on the spool 85 in the same direction as that of a restorable force of the spring 91 whereby the spool 85 is displaced in the rightward direction under the effect of a force which is derived by the restorable force of the spring 91 with the force due to the difference in pressure receiving area on the spool 85 added thereto.

While the spool 85 is returned in that way, a hydraulic pressure from the pump is transmitted to a hydraulic pressure for the pertinent clutch via the hydraulic passage 84, the hydraulic chamber 87, the orifice 90 and the hydraulic chamber 88, resulting in a shoot pressure as shown in FIG. 14(d) being generated.

The spring constant $k_2$ of the spring 92 is set to a pressure value Th larger than the initial pressure Pa but smaller than the aforesaid shoot pressure (see FIG. 14(d)).

Thus, during a period of return movement of the spool 85, the latter is displaced in the rightward direction to the neutral position as shown in FIG. 13 and thereafter it is displaced further in the rightward direction in the presence of the shoot pressure against the energizing force $k_2 x$ of the spring 92 whereby the right end surface of the spool 85 comes in contact with the detecting pin 94. Namely, in this case, the spool 85 is displaced in the rightward direction under the effect of a force derived by putting a condition of $P_1 = P_2$ in the formula (3).

Consequently, since the detecting pin 94 is electrically conducted to the earthed valve body 93 via the spool 85, the potential at the point c is lowered to a level of zero as shown in FIG. 14(e) and thereby no voltage appears at the point c (time $t_2$).

The potential at the point c is inputted in the controller 5 as a detecting signal S so that the controller 5 determines the termination of filling by an initial rising of the potential at the point c. When the termination of filling is determined, the controller 5 gradually increases the initial command electrical current I for the pertinent clutch from the initial pressure electrical current $I_o$ without delay (see FIG. 14(a)). Incidentally, when the controller 5 determines the termination of filling, it lowers a command electrical current for the clutch located at the previous stage to a level of zero as shown by an one-dotted line in FIG. 14(a).

As a result, a clutch pressure for the pertinent clutch is lowered from the aforesaid value of shoot pressure to the initial pressure Pa and thereafter it is gradually increased, as shown in FIG. 14(d). Accordingly, the spool 85 is once displaced in the leftward direction toward the neutral position from the operative state in which it contacts the pin 94. Thereafter, since the clutch pressure $P_2$ is gradually increased, it exceeds the set pressure Th of the spring 92 at a certain time point $t_3$. Consequently, the spool 85 is displaced in the rightward direction again against the energizing force $k_2 x$ of the spring 92 until its right end surface comes in contact with the detecting pin 94.

Thus, a potential at the point c is lowered to a level of zero again at the time $t_3$ and thereafter this zero level is maintained.

Specifically, since the potential at the point c is such that it becomes zero when the clutch is activated with a pressure higher than the set pressure Th and it assumes a predetermined value of voltage when the clutch pressure is lower than the preset pressure Th, presence or absence of the clutch pressure, that is, an engaged state of the clutch can be known by monitoring the potential at the point c. Additionally, in this case, since the potential at the point c is once lowered to a level of zero due to the shoot pressure on the termination of the fillings the termination of the latter can be detected by detecting the first lowering.

According to this embodiment, the electronic type hydraulic pressure control valve 60 having the aforementioned sensor section 63 attached thereto is provided for the respective clutches so that outputs from the plural sensor sections 63 are inputted in the controller 5, as shown in FIG. 8. The controller 5 monitors outputs from the plural sensor sections 63 to determine the termination of filling and presence or absence of double engagement on the basis of results derived from the monitoring. Namely, the controller 5 outputs a trigger command $I_o$ to a clutch to be brought in an engaged state and thereafter determines the time when the filling is terminated, by detecting the first lowering of a detection signal S to be inputted therein from the sensor section 63 of the clutch. In addition, the controller 5 determines which clutch is held in an engaged state, by monitoring outputs from the plural sensor sections 63, and in a case where clutch pressure detecting signals are simultaneously outputted from two sensor sections 63, it determines that this is identified as double engagement. When the double engagement is determined by the controller 5, the latter immediately outputs a command for lowering a hydraulic pressure for one of the clutches or takes a countermeasure such that all the clutches are turned off immediately, in order to prevent associated components or instruments from being damaged or injured due to the double engagement.

In this manner, according to this embodiment, since a spring 92 is disposed on the opposite side to the return spring 91 and a displacement of the spool 85 from the neutral position toward the spring 92 side is detected by the contact switch arrangement comprising a detecting pin 94 and resistances $R_1$ and $R_2$, this makes it possible to detect the termination of filling and determine a clutch engaged state by the single sensor arrangement including a single spool.

Further, since a relationship as represented by $S_1 + S_3 > S_2$ and $S_2 > S_3$ is provided for the respective pressure receiving areas $S_1$, $S_2$ and $S_3$ on the spool 85, a force generated by a difference in pressure receiving area with a restorable force of the return spring 91 added thereto is exerted on the spool 85 when the latter is displaced in the rightward direction after the termination of filling whereby the spool 85 can be returned to the neutral position at a high speed. Incidentally, when returning of the spool 85 is achieved only by a resilient force of the spring 91, the spool 85 has a reduced return speed with the result that an overshoot pressure as represented by a dotted line in FIG. 14(d) is generated on the termination of filling and this gives rise to a factor of causing a shock due to speed changing. In this case, the overshoot pressure can be reduced by increasing the return speed of the spool by the aforementioned difference in pressure receiving area.

It should of course be understood that the present invention should not be limited only to these embodiments but various changes or modifications may be made in a suitable manner. For instance, structural arrangement for detecting a filling time may be arbitralily made in any other fashion, provided that the termination of filling can be detected by a movement of the spool 21.

In addition, the pressure detecting switch 50 may be located at other suitable position within the interior of the valve body, provided that the position assures that a hydraulic pressure usable for the pertinent clutch can be detected.

INDUSTRIAL APPLICABILITY

The present invention is advantageously applicable to a transmission for a construction machine such as truck, wheel loader or the like as well as a passenger car.

We claim:

1. An apparatus for controlling hydraulic pressure adapted for use with a clutch comprising:
   (a) a plurality of clutch pressure control valves corresponding to a plurality of piston cylinders of a plurality of speed-changing clutches, each clutch pressure control valve including:
       a pressure control valve having a first spool provided with a solenoid on one end thereof and provided with a first spring on the other end thereof, said pressure control valve switching over an output port thereof to one of a drain port and a pump port connected to a pump in accordance with an instruction current applied to said solenoid and variably changing hydraulic pressure of said output port;
       a flow rate detecting valve having a second spool provided on one end thereof with a second spring and an orifice for supplying oil flow through an input port leading to said output port of said pressure control valve and said pump port to a clutch port leading to said piston cylinder of said speed-changing clutch, said one end of said second spool being effected by hydraulic pressure of said clutch port, the other end of said second spool being effected by hydraulic pressure of said input port, said flow rate detecting valve, when opened by a pressure differential across said orifice, effecting hydraulic pressure of said pump port leading to said input port to act directly on said clutch port and, when the oil is filled into said piston cylinder of said speed-changing clutch, closing said pump port and said clutch port; and
   (b) control means for controlling, at the time of speed changing, one of said plurality of piston cylinders of said speed-changing clutches connected with one of said plurality of pressure control valves required for said speed change by outputting said instruction current to said solenoid for said required pressure control valve.

2. The apparatus as claimed in claim 1 further including a plurality of filling detecting means corresponding to said plurality of piston cylinders of said speed-changing clutches, each adapted for detecting return of said second spool of said flow rate detecting valve to an initial position after having been displaced towards a direction to contract said second spring to thereby detect the completion of filling of the oil to said speed-changing clutch connected to said flow rate detecting valve having said second spool which has been displaced and detected its return to said initial position, and wherein said control means receives detection signals from said plurality of filling detecting means and detects on the basis of said detection signals the completion of filling of the oil to said piston cylinder of said speed-changing clutch connected to said flow rate detecting valve having said second spool which has been displaced and detected its return to said initial position.

3. The apparatus as claimed in claim 2, wherein said filling detecting means comprises a piston member, provided on the side where said second spring of said second spool is disposed, and detecting means for detecting displacement of said piston member so as to detect the completion of filling of the oil to said speed-changing clutch connected to said flow rate detecting valve having said second spool which has been displaced and detected its return to said initial position.

4. The apparatus as claimed in claim 3, wherein said detecting means comprises a member disposed at a position opposite to said one end of said second spool on which said second spring is disposed, and contact and noncontact detecting means for detecting contacting of said piston member with said member and parting of the former away from the latter.

5. The apparatus as claimed in claim 4, wherein said member comprises an electrically conductive housing cover disposed on a valve housing enclosing said pressure control valve and said flow rate detecting valve with an electrical insulating member interposed therebetween, and wherein said contact and noncontact detecting means is such that contacting of said piston member with said member and parting of the former away from the latter are represented in the form of an electric ON or OFF signal.

6. The apparatus as claimed in claim 5, wherein said contact and noncontact detecting means comprises voltage apply means for applying a predetermined intensity of voltage to said housing cover and voltage detecting means for detecting a voltage appearing on said housing cover when said piston member comes in contact with said housing cover and the former is parted away from the latter.

7. The apparatus as claimed in claim 2, wherein said filling detecting means comprises an electromagnetic pick-up disposed on said one end of said second spool of said flow rate detecting valve and outputs a voltage change signal corresponding to the displacement of said second spool of said flow rate detecting valve.

8. The apparatus as claimed in claim 1 further including a plurality of piston members and a plurality of clutch engagement detecting means corresponding to said plurality of piston cylinders of said speed-changing clutches, each piston member being disposed at a position where hydraulic pressure same to the hydraulic pressure of said clutch port acts, said piston member being effected by the hydraulic pressure of said clutch port in one direction and being forced by a predetermined resilient force of a spring in the other direction and each clutch engagement detecting means being adapted for detecting engagement of said speed-changing clutch on the basis of the displacement of said piston member, and wherein said control means detects a double engagement of speed-changing clutches on the basis of detection outputs of said plurality of clutch engagement detecting means.

9. The apparatus as claimed in claim 8, wherein said piston member is so set that said predetermined resilient force of said spring is appreciably larger than an initial pressure for the clutch on the completion of filling of the oil.

10. The apparatus as claimed in claim 8, wherein said clutch engagement detecting means comprises a member disposed at a position opposed to an end of said piston member and contact and noncontact detecting means for detecting contacting of said piston member with said member and parting of the former away from the latter.

11. The apparatus as claimed in claim 10, wherein said member comprises an electrically conductive housing cover disposed on a valve housing enclosing said pressure control valve and said flow rate detecting valve with an electrical insulating member interposed therebetween, and wherein said contact and noncontact detecting means is such that contacting of said piston member with said member and parting of the former away from the latter are represented in the form of an electric ON or OFF signal.

12. The apparatus as claimed in claim 11, wherein said contact and noncontact detecting means comprises voltage apply means for applying a predetermined intensity of voltage to said housing cover and voltage detecting means for detecting a voltage appearing on said housing cover when said piston member comes in contact with said housing cover and the former is parted away from the latter.

13. The apparatus as claimed in claim 1, wherein said second spool of said flow rate detecting valve is such that a pressure receiving area of said second spool located on the side where said flow rate detecting valve functions in the direction of closing is determined larger than that located in the side where said flow rate detecting valve functions in the direction of opening.

* * * * *